United States Patent
Zhong et al.

(10) Patent No.: US 7,254,327 B1
(45) Date of Patent: Aug. 7, 2007

(54) SWITCHING STATUS AND PERFORMANCE MONITORING TECHNOLOGY FOR WAVELENGTH SELECTIVE SWITCH AND OPTICAL NETWORKS

(75) Inventors: Shan Zhong, Ellicott City, MD (US); Vladimir Pelekhaty, Pikesville, MD (US); Jean-Luc Archambault, Severna Park, MD (US)

(73) Assignee: CIENA Corporation, Linthicum, MD (US)

( * ) Notice: Subject to any disclaimer, the term of this patent is extended or adjusted under 35 U.S.C. 154(b) by 606 days.

(21) Appl. No.: 10/768,020

(22) Filed: Feb. 2, 2004

Related U.S. Application Data (60) Provisional application No. 60/443,908, filed on Jan. 31, 2003, provisional application No. 60/499,467, filed on Sep. 3, 2003.

(51) Int. Cl.
*H04B 10/08* (2006.01)
(52) U.S. Cl. .......................... 398/33; 709/224
(58) Field of Classification Search ............ 398/30–33; 709/224
See application file for complete search history.

(56) References Cited

U.S. PATENT DOCUMENTS

| | | |
|---|---|---|
| 5,778,118 A | 7/1998 | Sridhar |
| 6,341,025 B1 | 1/2002 | Mizrahi et al. |
| 6,459,516 B1 | 10/2002 | Mizrahi et al. |
| 6,466,346 B1 | 10/2002 | Mizrahi et al. |
| 6,532,091 B1 * | 3/2003 | Miyazaki et al. ........... 398/175 |
| 2002/0170004 A1* | 11/2002 | Parrett et al. ................. 714/43 |
| 2004/0208430 A1* | 10/2004 | Chin ........................... 385/24 |

* cited by examiner

*Primary Examiner*—Leslie Pascal
(74) *Attorney, Agent, or Firm*—Clements Walker; Christopher L. Bernard; Tyler S. Brown (57) ABSTRACT

A universal in-service monitoring scheme to monitor performances of optical networks, including elements that make up the optical network, is proposed. The elements may be a wavelength selective switch or an optical cross connect. In this scheme, a small tunable probe signal is injected into the optical network via an input of the network. An output signal is received at the output and processed to determine if the probe signal is contained within the output signal. The scheme is such that probe signal injection and detection devices need not be physically co-located. Thus, the scheme is useful to test even optical network that spans thousands of miles. The probe signal is non-interfering with the network traffic so the network can be providing service while its performance is monitored. As examples of the probe signal detection mechanisms include lock-in amplification and coherent detection.

31 Claims, 10 Drawing Sheets

SWITCHING STATUS AND PERFORMANCE MONITORING TECHNOLOGY FOR WAVELENGTH SELECTIVE SWITCH AND OPTICAL NETWORKS

PROVISIONAL APPLICATION

The present application claims priority under 35 U.S.C. § 120 of provisional application 60/443,908 filed on Jan. 31, 2003 and 60/499,467 filed on Sep. 3, 2003, both of which are hereby incorporated by reference in their entirety.

FIELD OF THE INVENTION

The field of the invention generally relates to optical networks. More particularly, the invention relates to monitoring performances of optical networks, including elements of the optical network such as a wavelength selective switch or an optical cross connect.

BACKGROUND OF THE INVENTION

In next generation wavelength division multiplexed (WDM) networks, an optical cross-connect (OXC) provides the capability of routing the optical path of multiple input/output fiber ports on different wavelengths or wavebands. In order for network management to control this reconfigurable function, the switching status should be set prior to each data transmission. Since the optical connections for WDM signal transmission are strongly dependent on the switching status and switching quality of OXC, switching failure or malfunction of OXC can lead the data stream to an incorrect destination, cause a collision with another signal, degrade signal performance, and cause a loss of live traffic.

The current state of the art on switching status monitoring includes the use of either in-band pilot tone technology (used by Nortel Networks and documented in Hamazumi, et al JLT15, p. 2197, 1997)) or local out-band ID signal generation and detecting (documented in Chang, et al., PTL6, p. 899, 1998 and Zhong et al., Digest OFC'2000).

Wavelength selective switches (WSS)(an OXC with granularity of single wavelength), for example an N×N WSS, have been widely proposed and studied in the last few years as a cost-effective solution to provide a transparent by-pass for WDM express traffic at degree n nodes in optical networks. WSS's provide an optical cross-connect function with single channel granularity, where any WDM channel from any of the N inputs can be routed to any of the N outputs.

Until recently, the implementation of WSS in commercial systems was limited by the maturity of optical components and ultra-long haul optical transport technology. With these technologies now becoming available, there is a need to consider additional challenges associated with network monitoring and node management in the optical layer.

Current optical performance monitoring (OPM) solutions just basically monitor optical properties of existing channels along the transmission line. Monitoring of WSS, however, is more essential and demanding. Beyond the general physical layer monitoring, such as the insertion loss profile, cross-talk, etc., which affects the quality of signals passing through the WSS, there is no general capability to verify the connectivity of WSS, even before new traffic signals are provisioned in order to establish that a particular optical circuit is available and to avoid potential wavelength collisions downstream.

Current optical performance monitoring technology cannot satisfy these requirements, and thus an in-service, traffic signal independent monitoring schemes are desirable.

BRIEF DESCRIPTION OF THE DRAWINGS

Features of the present invention will become more fully understood to those skilled in the art from the detailed description given herein below with reference to the drawings, which are given by way of illustrations only and thus are not limitative of the invention, wherein.

DETAILED DESCRIPTION

For simplicity and illustrative purposes, the principles of the present invention are described by referring mainly to exemplary embodiments thereof. The same reference numbers and symbols in different drawings identify the same or similar elements. Also, the following detailed description does not limit the invention. The scope of the invention is defined by the claims and equivalents thereof.

The expression "optically connects" or "optically communicates" as used herein refers to any connection, coupling, link or the like by which optical signals carried by one optical element are imparted to the "connecting element." Such "optically communicating" devices are not necessarily directly connected to one another and may be separated by intermediate optical components and/or devices. Likewise, the expressions "connection", "operative connection", and "optically placed" as used herein are relative terms and do not necessarily require a direct physical connection.

In general, an N×M WSS fabric can be expressed as an N×M wavelength transfer matrix (WTM) $[W_{i,j}(\lambda)]_{N,M}$ to convert the input signal spectra $I_i(\lambda)$ into the different output signal spectra $O_j(\lambda)$. In this notation, $[W_{i,j}(\lambda)]_{N,M}$ represents the optical properties of the WSS, which depend on the particular configuration of the switch fabric. Fundamentally, the objective of WSS monitoring can be understood as characterizing each $W_{i,j}(\lambda)$ element at any time with or without the traffic signal.

As noted above, capability to verify the connectivity of an optical network, such as those including wavelength selective switches (WSS) and/or optical cross connects (OXC), even before new traffic signals are provisioned is desirable. In this manner, it can be established that a particular optical circuit path is available and avoid potential wavelength collisions from occurring downstream.

Figure 1:
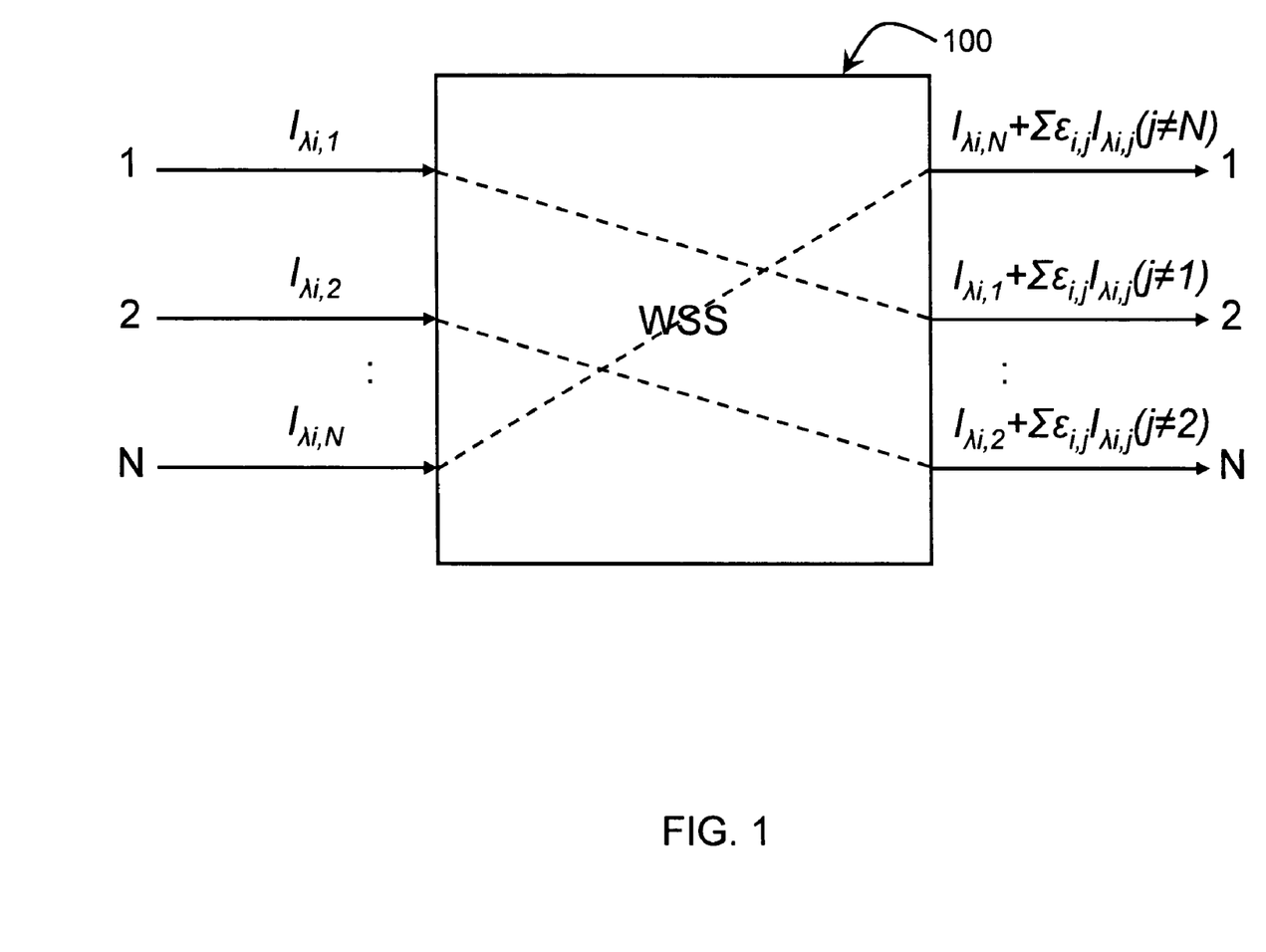
FIG. 1 illustrates a wavelength selective switch or an optical cross connect that is capable of dynamically rerouting wavelengths from different input ports to output ports according to an embodiment of the present invention.

FIG. 1 is illustrates a WSS or OXC that is capable of dynamically rerouting wavelengths from different input ports to output ports. For simplicity, an N×N WSS or OXC is assumed. As shown in FIG. 1, each routed output may contain cross-talk [e.g. $\Sigma \epsilon_{i,j} I_{\lambda_{i,j}} (j \neq N)$] from other inputs at the same wavelength (adjacent channel cross-talk is ignored and it is assumed that no multipath interferences exist).

In an aspect of the invention, the optical network monitoring scheme is proposed to confirm that each wavelength is correctly routed; to ensure that the optical network, including the WSS and/or the OXC, has been setup to avoid collisions from occurring while new traffic is added; and verify that the elements of the optical network (e.g. WSS, OXC) are functioning correctly and to keep the degradation in the system performance induced by each individual element at an acceptable level.

Figure 2:
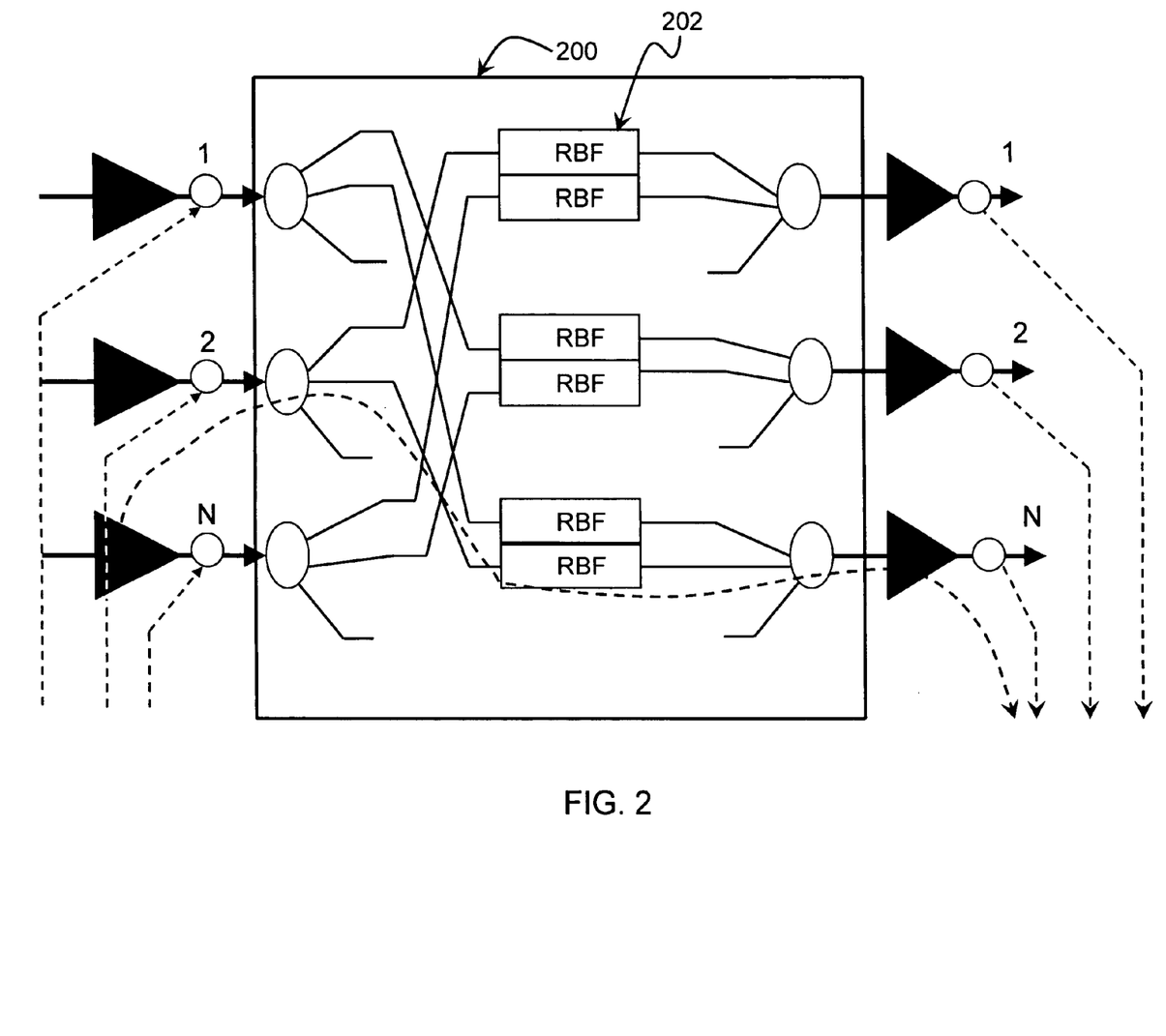
FIG. 2 illustrates a wavelength selective design incorporating reconfigurable blocking filters according to an embodiment of the present invention.
Figure 2A:
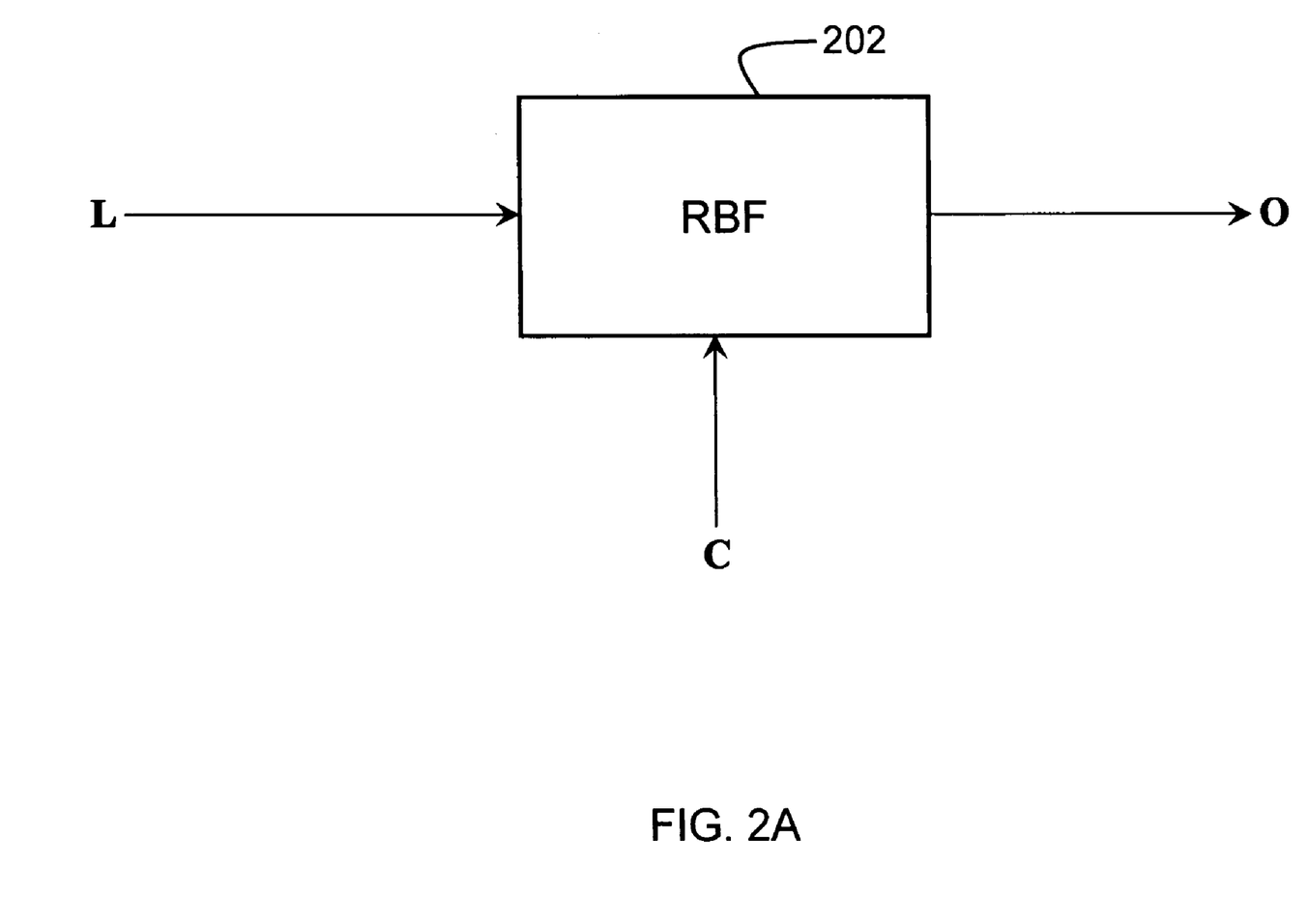
FIG. 2A illustrates an embodiment of the reconfigurable blocking filter according to an embodiment of the present invention.

For example, FIG. 2 illustrates a WSS design 200 incorporating reconfigurable blocking filters (RBF) 202. Also, FIG. 2A illustrates an embodiment of the reconfigurable blocking filter. Like other blocking filters, the RBF 202 also blocks a subset of spectrum of wavelengths (channels) it receives on its input and lets other channels pass through to the output. However, as the name suggest, the channels blocked or passed through are dynamically configurable in the RBF 202 through the control signals C. In this situation, the extinction ratio of the RBFs, individually or in combination, may be monitored by the invention.

It should be noted that in addition to WSS or OXC, optical networks may be made of many varied elements including splitters, combiners, couplers, blocking filters, long-haul transmission fibers, etc.

In an embodiment of the present invention, a probe signal may be injected into the optical network from the input side and detected at the output side. The optical network may include WSS or OXC fabric. Indeed, the optical network may include multiple WSS and/or OXC fabrics combined in an arbitrary manner to meet the required services. It is desired that the probe signal be generated by a wavelength tunable source such as a tunable laser. In this manner, each working wavelength may be covered.

It is also desired that the probe signal power or amplitude be small to minimize interference with data-carrying traffic. For example, the probe signal may be substantially 30 dB down compared to the traffic signal, or even lower. At this level, the probe signal may be considered to be non-interfering or at least substantially non-interfering.

It is further desired that the frequency of the probe-signal be set to a frequency different than those from the standard International Telecommunications Union (ITU) grid. In this manner, coherent cross-talk may be mitigated. For example, the probe signal may be set at a frequency that is 12.5 GHz away from the ITU grid.

On the output side, output signals of the optical network are analyzed to detect the presence of the probe signal. For example, coherent detection or a lock-in amplification mechanism maybe utilized for detection. In this manner, state of the optical network may be accurately characterized including determining whether or not WDM channels are present or not.

It should be noted that the probe signal injection and the probe signal detection need not be geographically co-located, particularly while lock-in amplification mechanism is used. For example, the optical network to be tested may include a long-haul transmission line such that the inputs and outputs are thousands of miles apart.

Figure 3:
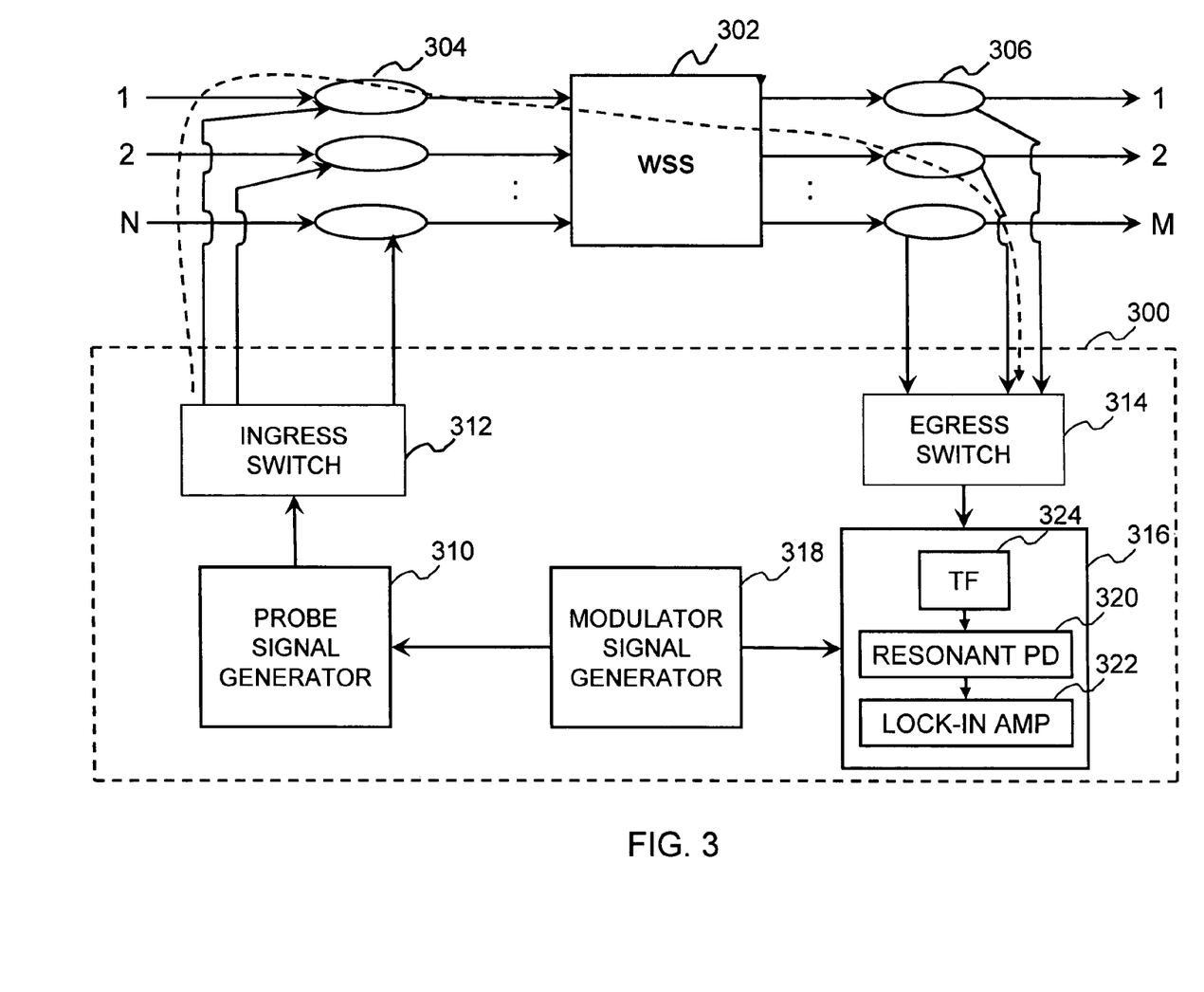
FIG. 3 illustrates an apparatus to monitor performance of an optical network utilizing lock-in amplification according to an embodiment of the present invention.

An example of an apparatus 300 to monitor performance of an optical network 302 is shown in FIG. 3. In this instance, the optical network 302 is shown as a wavelength selective switch with N inputs and N outputs (an N×N WSS). However, it should be noted that the number of inputs and outputs need not be the same, i.e. the optical network 302 may be an N×M WSS. It should also be noted that the optical network 302 may be an N×M optical cross connect. In FIG. 3, a path from input 1 of the WSS 302 to the output 2 is tested and monitored. However, it should be noted that any path may be tested and monitored.

Each input to the WSS 302 may be optically connected to an input optical coupler 304. Each input optical coupler 304 may include a plurality of inputs and at least one output. Each input of the input optical coupler 304 is capable of receiving optical signals from an optical signal source. In this manner, each input coupler 304 may receive optical signals from multiple sources and output the optical signals to the corresponding input of the WSS 302.

In a mirror fashion, each output from the WSS 302 may be connected to an output optical coupler 306. Each output optical coupler 306 may include at least one input and a plurality of outputs. The input of the output optical coupler may receive output signals from the corresponding output of the WSS 302 and output them to its plurality of outputs.

The use of the input and output optical couplers 304, 306 enables the performance monitoring to take place without interfering with normal data traffic. For example, optical taps which only tap a small percentage of the input signal helps to minimize or prevent interference. The input and output couplers 304, 306 may be part of the optical network 302 or part of the monitoring apparatus 300.

The performance monitoring apparatus 300 may include at least one probe signal generator 310 configured to generate a probe signal. In an embodiment, the probe signal generator 310 is a tunable laser. As noted above, by using a tunable laser, the frequency of the probe signal as well as the strength of the probe signal may be adjusted as desired. It should be noted that other devices, such as a broadband white light source plus a tunable filter, may be used to generate the probe signal.

The apparatus 300 may also include an ingress switch 312. The ingress switch 312 receives the probe signal from the probe signal generator 310 and selectively directs the probe signal to one or more inputs of the WSS 302. For example, as shown in FIG. 3, the outputs of the ingress switch 302 are optically connected to the input optical couplers 304 and the ingress switch 302 selectively directs the probe signal to any of the desired input optical coupler 304.

In this instance, the ingress switch 312 is depicted as a 1×N switch (one input, N outputs). While not shown, it should be noted that the ingress switch 312 may include multiple inputs, i.e. a K×N switch. The K×N switch may be capable of directing probe signal received on each of its K inputs to any of its N outputs independently of and simultaneously with directing a probe signal received on any of its other inputs. As will be discussed below, this is useful where multiple probe signals are utilized.

Conversely, the apparatus 300 may include an egress switch 314. Each input of the egress switch 314 receives an output signal from the corresponding output of the WSS 302 and selectively directs the one or more output signals from the WSS 302 to its input. For example, as shown in FIG. 3, the inputs of the egress switch 314 are optically connected to the output optical couplers 306 and the egress switch 314 selectively directs the optical signals from the desired output coupler(s) 306 to its input.

In an embodiment, the egress switch 314 is a N×1 switch (N inputs, one output). While not shown, it should be noted that the egress switch 314 may include multiple outputs, i.e. a N×L switch. The N×L egress switch 314 may be capable of directing the output signal received on each of its input to any of its L outputs independently of and simultaneously with directing any output signal received on any of its other inputs. Again, this is useful in situations where multiple probe signals are being detected simultaneously.

The apparatus 300 may further include at least one probe signal detector 316. The probe signal detector 316 receives the output signal directed by the egress switch 314 and detects the presence of the probe signal in the optical signal.

In the particular embodiment shown in FIG. 3, a lock-in amplification mechanism is used to detect the presence of the probe signal. Lock-in amplification is particularly useful in detecting a weak signal (probe signal) mixed in with a strong signal (data traffic) in the output signal. In this instance, the strength of the probe signal may be as much as 30 dB below the strength of the data traffic of a single WDM channel (or even lower). It should be noted that when the strength of the probe signal is so low as compared to the data traffic, the interference is so minimal such that the probe signal may be considered to be non-interfering.

The apparatus 300 may include a modulation signal generator 318, which generates a modulation signal of a predetermined modulation frequency, for example at 1 kHz. The generator 318 may be connected to the probe signal generator 310, electrically or optically, such that the probe signal is modulated based on the modulation signal. It should be noted that the modulation signal, including the modulation frequency, may be adjusted as desired.

The probe signal detector 316 may include a resonant photo detector 320 and a lock-in amplifier 322. The resonant photo detector 320 detects the presence of the probe signal within the output signal and the lock-in amplifier 322 amplifies the probe signal detected by the photo detector 320.

Figure 4:
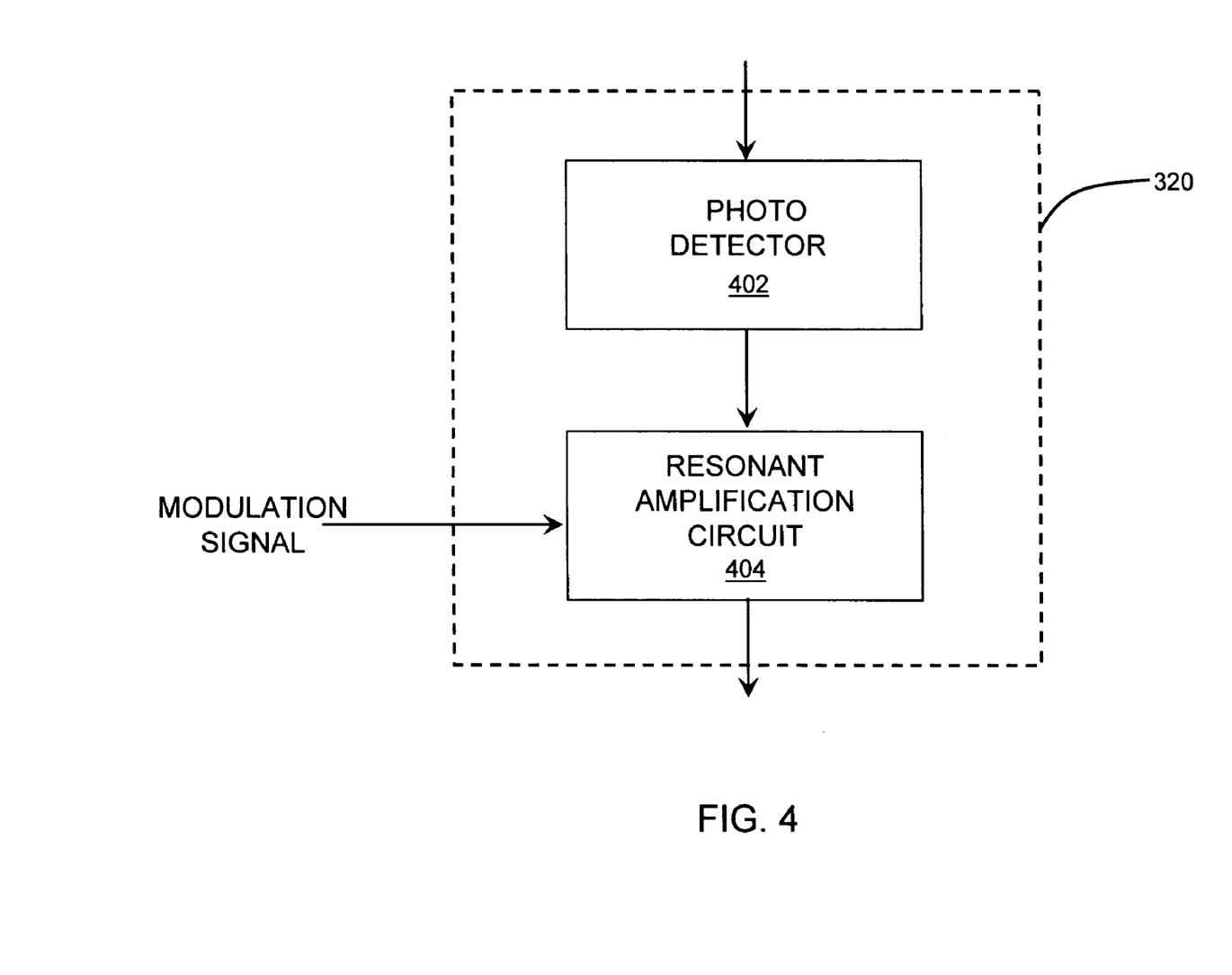
FIG. 4 illustrates an example of a resonant photo detector according to an embodiment of the present invention.

As shown in FIG. 4, the resonant photo detector 320 may be a combination of a photo detector 402 configured to receive the optical signal and a resonant amplification circuit 404 configured to filter out data signal and noise outside of a resonant band from the output signal. The probe signal detection is enhanced when the resonant amplification circuit 404 resonates at a frequency that is substantially equal to the frequency of the modulation signal from the modulation signal generator 318.

Referring back to FIG. 3, the lock-in amplifier 322 amplifies the probe signal based on the modulation signal from the signal generator 318. The lock-in amplifier 322 may be an analog amplifier or a digital signal processing (DSP) amplifier. One advantage of a DSP amplifier over an analog amplifier is that the DSP amplifier provides a greater dynamic range. Experiments conducted by the inventors indicate that a DSP based lock-in amplification probe signal detector is able to detect modulated probe signal down to −85 dBm. If the probe signal is at −30 dBm, then the provided dynamic range is substantially 55 dB.

The probe signal detector 316 may also include a tunable filter 324 that receives the output signal from the egress switch 314. The tunable filter 324 is designed to filter out noise contributions from other WDM channels to the output signal. The filtered output is then sent to the resonant photo detector 316. This enables easier detection of the presence of the probe signal in the output signal.

Figure 5:
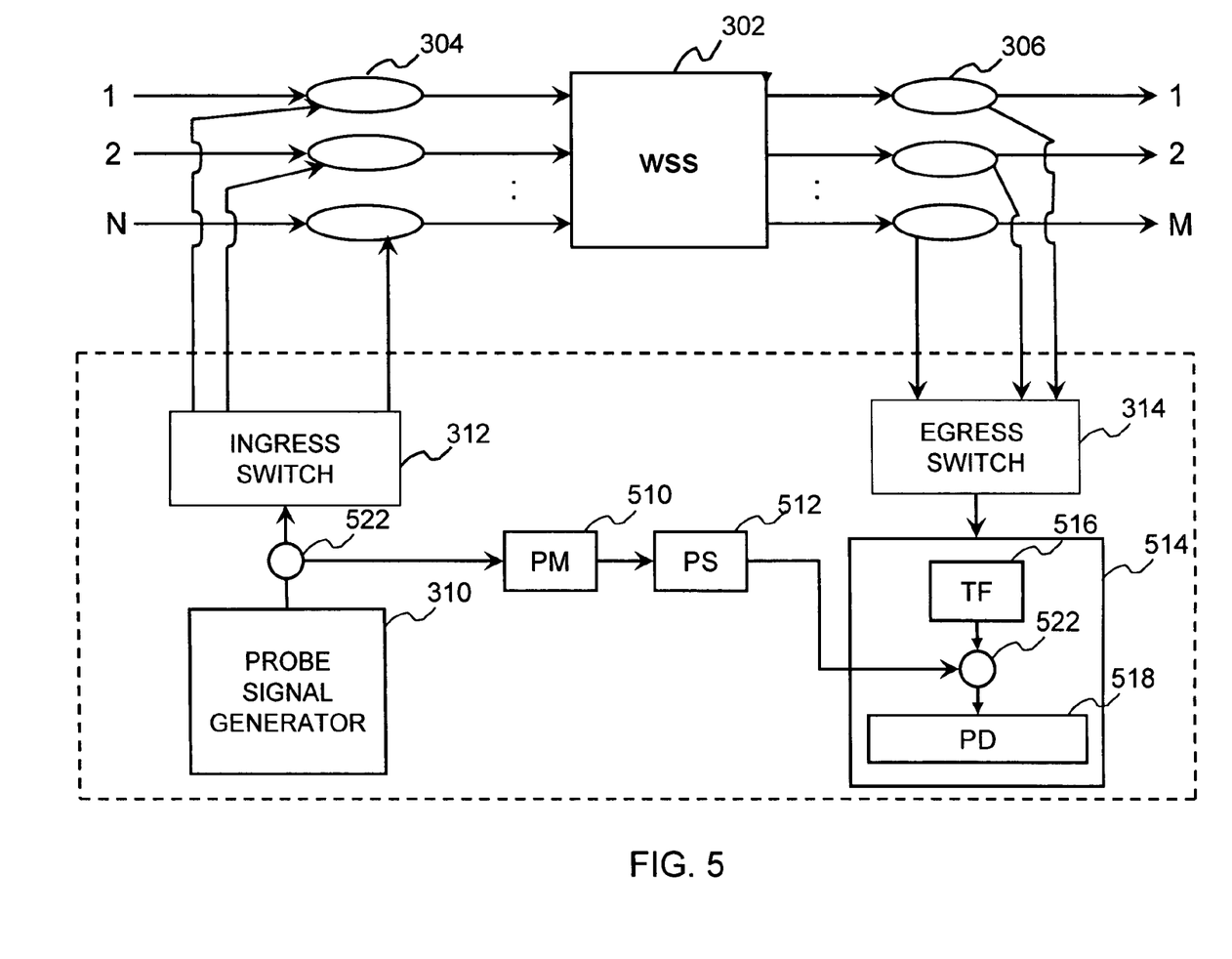
FIG. 5 illustrates an apparatus to monitor performance of an optical network utilizing coherent detection according to an embodiment of the present invention.

In addition to the lock-in amplification, coherent detection may also be used to detect the presence of the probe signal within the output signal. FIG. 5 illustrates an embodiment of a performance monitoring apparatus 500 using this scheme. The apparatus 500 includes devices that are similar to those included in apparatus 300 and these will not be discussed.

The apparatus 500 does differ from the apparatus 300 in that there is no modulation signal generator 318. Instead, the output of the probe signal generator 310 is received by a phase modulator 510 (through a coupler 520 for example). The phase modulator 510 generates a substantially constant modulated signal based on the probe signal. The output of the phase modulator 510 is connected to a polarization scrambler 512, which reduces the fluctuations caused in the output of the phase modulator.

In this manner, the polarization of the output of the polarization scrambler 512 is fairly uniformly distributed. This is useful to enhance the possibility of detection of the probe signal, since the probe signal sent through the WSS 302 and received at one of the outputs undergoes a random polarization.

The probe signal detector 512 includes a tunable filter 516 working in concert with a photo detector 518 to detect the presence of the probe signal, while beating with the output of the polarization scrambler 512.

Figure 6:
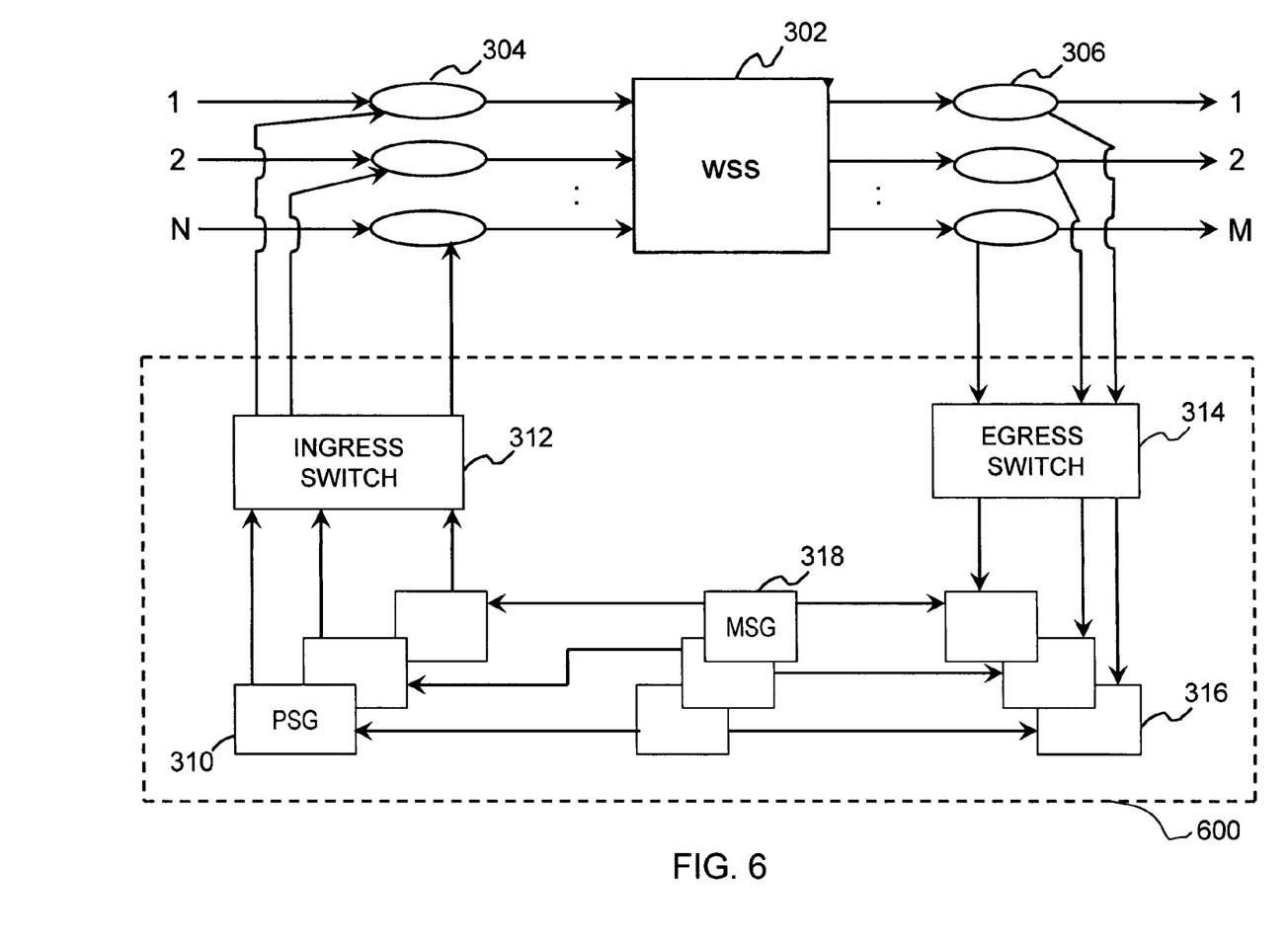
FIG. 6 illustrates an apparatus to monitor performance of an optical network which includes a plurality of probe signal generators, detectors, and modulation signal generators according to an embodiment of the present invention.

It has been indicated above that the invention is not limited to a single probe signal generator nor is it limited to a single probe signal detector. FIG. 6 shows a performance monitoring apparatus 600 that illustrates this point. The apparatus 600 is much like the apparatus 300 of FIG. 3, but includes a plurality of probe signal generators 310, a plurality of modulation signal generators 318, and a plurality of probe signal detectors 316. The plurality of probe signals may be generated and sent substantially simultaneously by the probe signal generators 310. Also each of the plurality of probe signal detectors 316 may detect the presence of its respective probe signal substantially simultaneously with other probe signal detectors 316.

Figure 7:
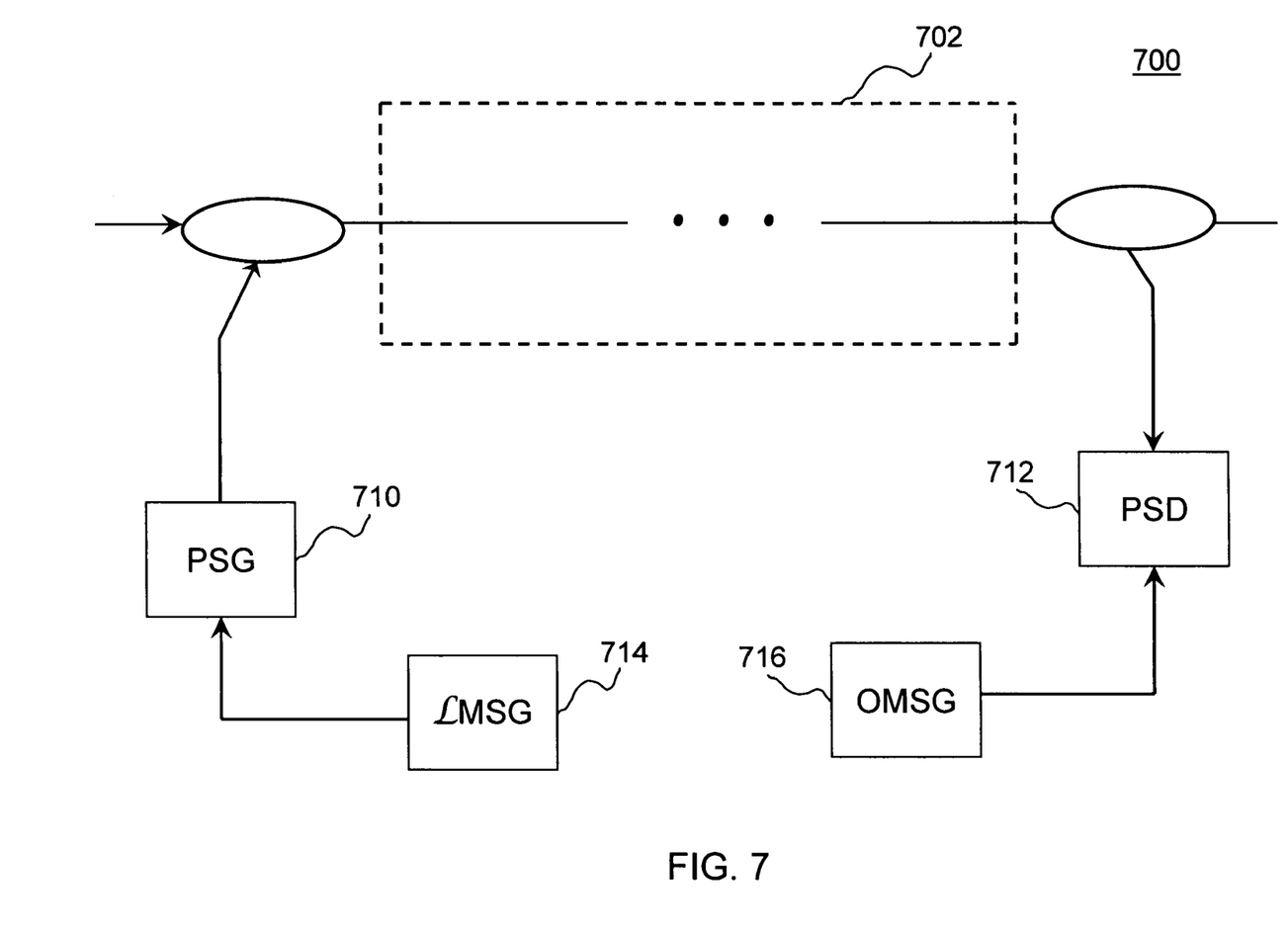
FIG. 7 illustrates an apparatus to monitor performance of an optical network according to an embodiment of the present invention wherein the probe signal generation and detection are not co-located.

It has also been indicated above that performance monitoring apparatus may be such that all parts need not be geographically co-located. An example of this is shown in FIG. 7. As shown, the optical network performance monitoring apparatus 700 monitors the performance of the optical network 702. For example, the optical network 702 may include ultra long haul optical transmission systems such that the input and the output of the network 702 are thousands of miles apart. In this situation, the probe signal generator 710 and the probe signal detector 712 are not co-located.

While only a single instances of the probe signal generator 710 and the probe signal detector 712 are shown, it should be noted that multiple generators 710 and detectors 712 can be included.

The probe signal generator 710 may be a tunable laser wherein the probe signal is modulated based on an input modulation signal generated by the input modulation signal generator 714 that generates the input modulation signal at a predetermined input modulation frequency. The connection between the probe signal generator 710 and the input modulation signal generator 714 may be electrical or optical.

The apparatus 700 may also include an output modulation signal generator 716 optically or electrically connected to the probe signal detector 712 and may generate a reference output modulation signal at a reference output frequency. The output signal is modulated within the probe signal detector 712 base on the output modulation signal.

The probe signal detector 712 may modulate the output signal as follows. Based on the reference output frequency, an upper limit modulation frequency and a lower limit modulation frequency is determined. For example, the lower and upper limits may be 10% below and above the reference frequency. Taking this example further, if the reference output frequency is 1 kHz, then the lower limit may be 900 Hz and the upper limit may be 1.1 kHz. As the example indicates, the reference output frequency is included in the range of modulation frequencies.

The output signal is modulated with frequencies within the range specified by the upper and lower modulation frequency limits and the results are processed to detect the probe signal. For example, the modulation results may be added and if a strength of a signal at a particular frequency is above a certain threshold, it may be determined that the probe signal of the particular frequency has been detected. Typically, the input modulation frequency and the output modulation frequency is the same or substantially the same.

The probe signal detector 712 may be a lock-in amplifier based detector such as the detector 316 shown in FIG. 3. It is very likely that the long haul optical network performance monitoring apparatus 700 will be less sensitive than the apparatus 300 shown in FIG. 3. However, dynamic range of the apparatus 700 is sufficient, i.e. more than 30 dB, such that detection is possible, especially when DSP lock-in amplifiers are utilized.

Figure 8:
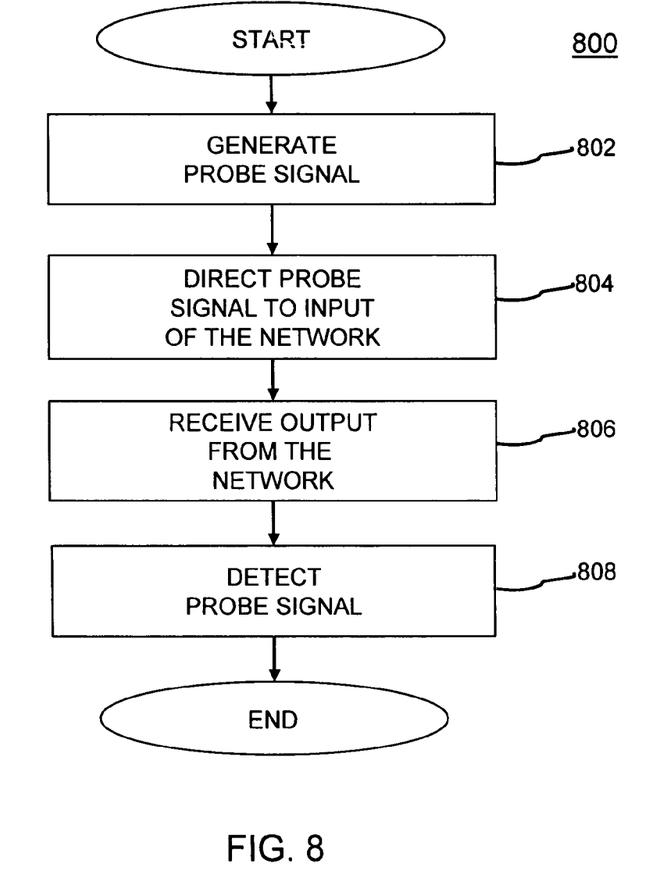
FIG. 8 illustrates a method to monitor the performance of an optical network according to an embodiment of the present invention.

FIG. 8 illustrates a method 800 to monitor the performance of an optical network, or optical elements such as a WSS or OXC. As shown, a probe signal is generated (step 802). The probe signal is directed to a particular input of the optical network (step 804). Then an output signal is received from the network (step 806) and the output signal is processed to detect the presence of the probe signal within the output signal (step 808).

Again, as noted above, it is desired that the probe signal be non-interfering with the traffic on the optical network. The probe signal may be tuned to a desired frequency and modulated at the predetermined modulation frequency. If multiple probe signals are generated at step 802, then each probe signal may be individually modulated as well. In this manner, multiple paths of the optical network may be tested simultaneously.

In step 808, either lock-in amplification or the coherent detection scheme may be used to detect the presence of the probe signal. The output signal may be modulated at the predetermined modulation frequency. If multiple probe signals are to be detected, then each output signal may be modulated individually related to the modulation of the correspondingly generated probe signal. In this manner, multiple probe signals may detected simultaneously.

Figure 9:
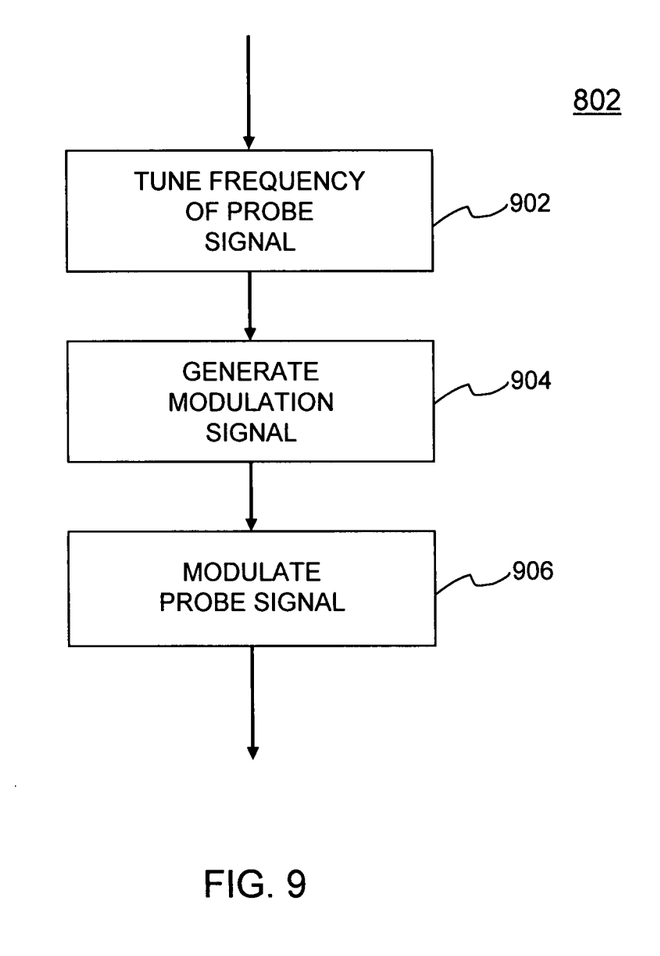
FIG. 9 illustrates steps for generating the probe signal according to an embodiment of the present invention.

As shown in FIG. 9, the probe signal generation step 802 may include tuning the frequency of the probe signal (step 902), generating a modulation signal at a predetermined modulation frequency (step 904), and modulating the probe signal based on the modulation signal (step 906). It should be noted that steps 902 and 904 may be performed in an order other than shown in FIG. 9.

With the various embodiments of the present invention, the performance of an optical network, or any generic configuration, may be monitored effectively, without being limited geographically, and at low cost.

While the invention has been described with reference to the exemplary embodiments thereof, it is to be understood that various modifications may be made to the described embodiments without departing from the spirit and scope of the invention thereof. The terms as descriptions used herein are set forth by way of illustration only and are not intended as limitations.

What is claimed is:

1. An apparatus to monitor performance of an optical network, comprising:
   at least one probe signal generator configured to generate a probe signal, wherein said at least one probe signal generator is a tunable laser such that a frequency of the probe signal is tunable;
   at least one modulation signal generator optically or electrically connected to said at least one probe signal generator, said at least one modulation signal generator configured generate a modulation signal at a predetermined modulation frequency, wherein the probe signal generated by said probe signal generator is modulated based on the modulation signal;
   an ingress switch including at least one input and a plurality of outputs, wherein said at least one input of said ingress switch is optically connected to said at least one probe signal generator and said plurality of outputs are optically connected to a plurality of inputs of the optical network, said ingress switch being configured to selectively direct the probe signal to at least one of the plurality of inputs of the optical network;
   an egress switch including a plurality of inputs and at least one output, wherein said plurality of inputs of said egress switch are optically connected to a plurality of outputs of the optical network, said egress switch being configured to selectively direct an output signal from at least one of said plurality of outputs of said optical network to said at least one output of said egress switch; and
   at least one probe signal detector optically connected to said at least one output of said egress switch, said at least one probe signal detector configured to detect a presence of the probe signal in the output signal,
   wherein said at least one probe signal detector comprises a resonant photo detector configured to receive the output signal and to detect the probe signal within the output signal and a lock-in amplifier optically or electrically connected to said at least one modulation signal generator, said lock-in amplifier configured to amplify the probe signal detected by said at least one resonant photo detector based on the modulation signal.

2. The apparatus of claim 1, wherein the probe signal generated by said at least one probe signal generator is non-interfering with network traffic on the optical network.

3. The apparatus of claim 2, wherein a strength of said probe signal is substantially at least −30 dB below a single wavelength division multiplexed (WDM) channel.

4. The apparatus of claim 2, wherein the optical network is a wavelength selective switch (WSS) or an optical cross connect (OXC).

5. The apparatus of claim 4, wherein:
   a plurality of probe signal generators are optically connected to a corresponding input of a plurality, of inputs of said ingress switch, each of said plurality of probe signal generators connected to a corresponding one of a plurality of modulation signal generator generating a corresponding predetermined modulation frequency, and a plurality of probe signal detectors are optically connected to a corresponding output of a plurality of outputs of said egress switch, each of said plurality of probe signal detectors being configured to detect a presence of a corresponding probe signal from a corresponding output signal from said WSS or OXC.

6. The apparatus of claim 5, wherein at least one of the following is true:

said plurality of probe signal generators are capable of sending the plurality of probe signals substantially simultaneously; and said plurality of probe detectors are capable of detecting the presence of the plurality of probe signals substantially simultaneously.

7. The apparatus of claim 2, wherein said at least one probe signal generator is not geographically co-located with said at least one probe signal detector.

8. The apparatus of claim 7, wherein said at least one probe signal generator is a tunable laser such that a frequency of the probe signal is tunable, the apparatus further comprising at least one input modulation signal generator optically or electrically connected to said at least one probe signal generator, said at least one input modulation signal generator configured generate an input modulation signal at a predetermined input modulation frequency, wherein the probe signal generated by said at least one probe signal generator is modulated based on the input modulation signal.

9. The apparatus of claim 8, further comprising at least one output modulation signal generator optically or electrically connected to said at least one probe signal detector, said at least one output modulation signal generator configured to generate a reference output modulation signal at a reference output frequency, wherein the at least one probe signal detector modulates the output signal based on the reference output reference signal.

10. The apparatus of claim 9, wherein said at least one probe signal detector is configured to modulate the output signal using a range of modulation frequencies, wherein the reference output modulation frequency is included in the range of the modulation frequencies.

11. The apparatus of claim 10, wherein the reference output modulation frequency is substantially equal to the input modulation frequency.

12. The apparatus of claim 10, wherein said at least one probe signal detector comprises:

a resonant photo detector configured to receive the output signal and to detect the probe signal within the output signal; and a lock-in amplifier configured to amplify the probe signal detected by said at least one resonant photo detector based on the output modulation frequency.

13. The apparatus of claim 1, wherein said at least one probe signal detector further comprises a tunable filter configured to receive the output signal from said at least one output of said egress switch, to substantially filter out noise contributions from other wavelength division multiplexed (WDM) channels to the output signal, and to send the filtered output signal to said resonant photo detector.

14. The apparatus of claim 1, wherein said lock-in amplifier is a digital signal processing (DSP) lock-in amplifier.

15. The apparatus of claim 1, further comprising:

at least one phase modulator optically connected to said at least one probe signal generator, said at least one phase modulator configured to generate a substantially constant modulated signal based on the probe signal; and at least one polarization scrambler optically connected to receive the substantially constant modulated signal from said at least one phase modulator, at least one polarization scrambler configured to reduce fluctuations caused by polarization change in the substantially constant modulated signal, wherein said at least one probe signal detector is optically connected to said at least one polarization scrambler, said at least one probe signal detector further configured to detect the presence of the probe signal in the output signal based on a signal from said at least one polarization scrambler.

16. The apparatus of claim 1, wherein said resonant photo detector comprises:

a photo detector configured to receive the output signal; and a resonant amplification circuit configured to substantially filter out data signal and noise outside of a resonant band from the output signal.

17. The apparatus of claim 16, wherein said resonant amplification circuit is configured to resonate at frequency substantially equal to the modulation frequency of the modulation signal generated by said modulation signal generator.

18. A method to monitor performance of an optical network, the method comprising:

generating a probe signal, wherein said step of generating said probe signal comprises tuning a frequency of the probe signal, wherein said step of generating the probe signal further comprises generating a modulation signal of a predetermined modulation frequency and modulating the probe signal based on the modulation signal;

selectively sending the probe signal to at least one of a plurality of inputs of the optical network;

selectively receiving an output signal from at least one of a plurality of outputs of said optical network; and detecting a presence of the probe signal in the output signal, wherein said step of detecting the probe signal comprises lock-in amplifying the probe signal based on the modulation signal.

19. The method of claim 18, wherein the probe signal generated is non-interfering with network traffic on the optical network.

20. The method of claim 19, wherein a strength of said probe signal is substantially at least −30 dB below a single wavelength division multiplexed (WDM) channel.

21. The method of claim 19, wherein the optical network is a wavelength selective switch (WSS) or an optical cross connect (OXC).

22. The method of claim 21, further comprising at least one of:

substantially simultaneously sending a plurality of probe signals to the plurality of inputs of the WSS or OXC; and substantially simultaneously detecting corresponding presence of the plurality of probe signals from the corresponding plurality of outputs from the WSS or OXC.

23. The method of claim 19, wherein:

said step of generating the probe signal further comprises modulating the probe signal at an input modulation frequency, and said step of detecting the presence of the probe signal further comprises modulating the output signal based on a reference output modulation frequency.

24. The method of claim 23, wherein said step of detecting the presence of the probe signal based on the reference output modulation frequency comprises modulating the output signal using a range of modulation frequencies, wherein the reference output modulation frequency is included in the range of the modulation frequencies.

25. The apparatus of claim 24, wherein the reference output modulation frequency is substantially equal to the input modulation frequency.

26. The method of claim 24, wherein said step of detecting the presence of the probe signal further comprises amplifying the probe signal based on the output modulation frequency.

27. The method of claim 18, wherein said step of detecting the probe signal further comprises filtering out data signal and noise outside of a resonant band from the output signal prior to performing said lock-in amplifying step.

28. The method of claim 18, wherein said step of detecting at least one probe signal detector further comprises substantially filtering out noise contributions from other wavelength division multiplexed (WDM) channels to the output signal prior to performing said lock-in amplifying step.

29. The method of claim 18, wherein said step of lock-in amplifying comprises lock-in amplifying with digital signal processing (DSP).

30. The method of claim 18, further comprising:
generating a substantially constant modulated signal based on the probe signal; and
reducing fluctuations of the substantially constant modulated signal caused by polarization change to generate a resulting signal,
wherein said step of detecting the presence of the probe signal further comprises detecting the probe signal in the output signal based on the resulting signal.

31. The apparatus of claim 30, wherein said step of detecting the presence of the probe signal utilizes a coherent detection scheme.

* * * * *